(12) United States Patent
Beliveau et al.

(10) Patent No.: US 8,715,511 B2
(45) Date of Patent: May 6, 2014

(54) METHOD AND APPARATUS FOR SEWAGE GRIT REMOVAL

(75) Inventors: Marc Beliveau, Montreal (CA); Michel Bruneau, Laval (CA); Martin Couture, Laval (CA); Karim Essemiani, Houston, TX (US)

(73) Assignee: Veolia Water Solutions & Technologies Support, Saint Maurice, Cedex (FR)

( * ) Notice: Subject to any disclaimer, the term of this patent is extended or adjusted under 35 U.S.C. 154(b) by 341 days.

(21) Appl. No.: 13/130,659

(22) PCT Filed: Nov. 27, 2009

(86) PCT No.: PCT/CA2009/001746
§ 371 (c)(1),
(2), (4) Date: May 23, 2011

(87) PCT Pub. No.: WO2010/063107
PCT Pub. Date: Jun. 10, 2010

(65) Prior Publication Data
US 2011/0240568 A1      Oct. 6, 2011

Related U.S. Application Data

(60) Provisional application No. 61/200,560, filed on Dec. 1, 2008.

(51) Int. Cl.
*B01D 21/02* (2006.01)
*B01D 21/24* (2006.01)
*B01D 21/26* (2006.01)
*B01D 21/00* (2006.01)

(52) U.S. Cl.
CPC ............ *B01D 21/26* (2013.01); *B01D 21/0039* (2013.01); *B01D 21/0087* (2013.01); *B01D 21/02* (2013.01); *B01D 21/24* (2013.01); *B01D 21/2405* (2013.01); *B01D 21/2411* (2013.01); *B01D 21/245* (2013.01)
USPC ........ 210/787; 210/788; 210/801; 210/512.1; 210/512.3; 210/532.1; 210/257.1

(58) Field of Classification Search
CPC ............ B01D 21/0039; B01D 21/0087; B01D 21/02; B01D 21/24; B01D 21/2405; B01D 21/2411; B01D 21/245; B01D 21/26
USPC ........ 210/787, 788, 801, 512.1, 512.3, 532.1, 210/257.1
See application file for complete search history.

(56) References Cited

U.S. PATENT DOCUMENTS

| 2,352,772 A | 7/1944 | Darby |
| 2,491,801 A | 12/1949 | Debrey |

(Continued)

FOREIGN PATENT DOCUMENTS

| GB | 1148795 | 4/1969 |
| WO | 8502350 | 6/1985 |

OTHER PUBLICATIONS

Jones & Attwood, Jeta Grit Trap, Jul. 1990.

(Continued)

*Primary Examiner* — David A Reifsnyder
(74) *Attorney, Agent, or Firm* — Fraser Clemens Martin & Miller LLC; J. Douglas Miller

(57) ABSTRACT

Apparatus and method are provided for separating grit from liquid sewage while retaining organic solids in suspension. A sustained rotational liquid sewage first fluid flow, an induced upward liquid sewage second fluid flow, and a sustained rotational liquid sewage third fluid flow are employed in an apparatus having a cylindrical grit settling main chamber, a grit storage secondary chamber including a central grit settling access top mouth opening, a vertical shaft, a means for causing rotation of the vertical shaft, and a partition extending transversely through the main chamber and forming upper and lower subchambers. A fluid flow speed gradient is established between the liquid sewage third fluid flow and the liquid sewage first fluid flow. In this manner, grit is separated from liquid sewage.

28 Claims, 11 Drawing Sheets

(56) References Cited

U.S. PATENT DOCUMENTS

| | | |
|---|---|---|
| 3,879,296 A | 4/1975 | Schneider |
| 3,941,698 A | 3/1976 | Weis |
| 4,107,038 A | 8/1978 | Weis |
| 4,519,907 A | 5/1985 | Rooney |
| 4,767,532 A | 8/1988 | Weis |
| 4,848,991 A | 7/1989 | Bielefeldt |
| 4,865,751 A | 9/1989 | Smisson |
| 4,983,294 A | 1/1991 | Lamb |
| 5,116,488 A | 5/1992 | Torregrossa |
| 5,298,172 A | 3/1994 | Smith |
| 5,407,584 A | 4/1995 | Broussard |
| 5,569,379 A | 10/1996 | Scloss |
| 5,788,848 A | 8/1998 | Blanche et al. |
| 6,171,498 B1 | 1/2001 | Fassbender et al. |
| 6,852,239 B2 | 2/2005 | Wilson |
| 6,881,350 B2 | 4/2005 | Wilson |
| 7,468,136 B2 | 12/2008 | Bache |
| 2008/0105604 A1 | 5/2008 | Weis |

OTHER PUBLICATIONS

Piste Grit Removal System, S&L, Smith & Loveless, Inc., Publication Document—Brochure 950, Nov. 2008.

Couture, Martin; Steele, Alan; Bruneau, Michel; Gadbois, Alain; Hohman, Brittany; "Achieving Greater Efficiency for 360° Rotational Grit Removal Technology Using Empirical Data and CFD Analysis"; Water Environment Federation TEC 2009 Conference; Oct. 12-14, 2009; pp. 773-783; Orlando, Florida, USA.

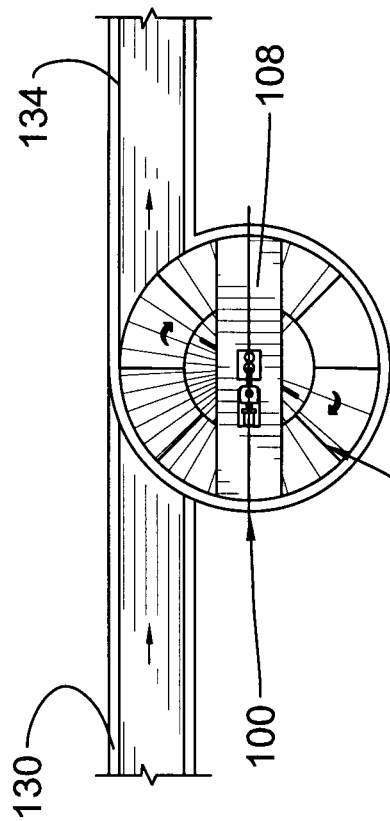
Fig. 1
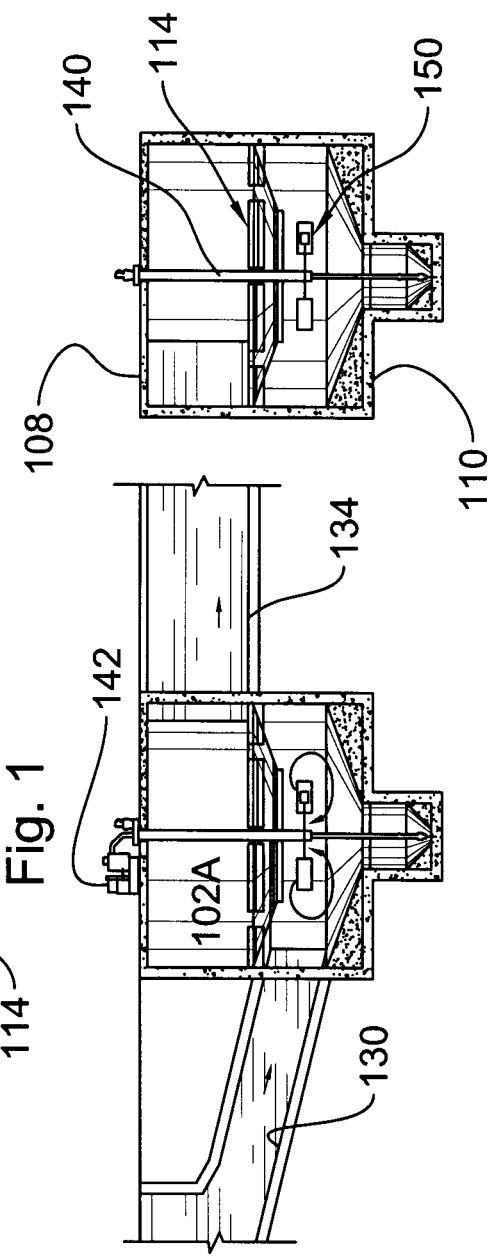
Fig. 3
Fig. 2
Fig. 4

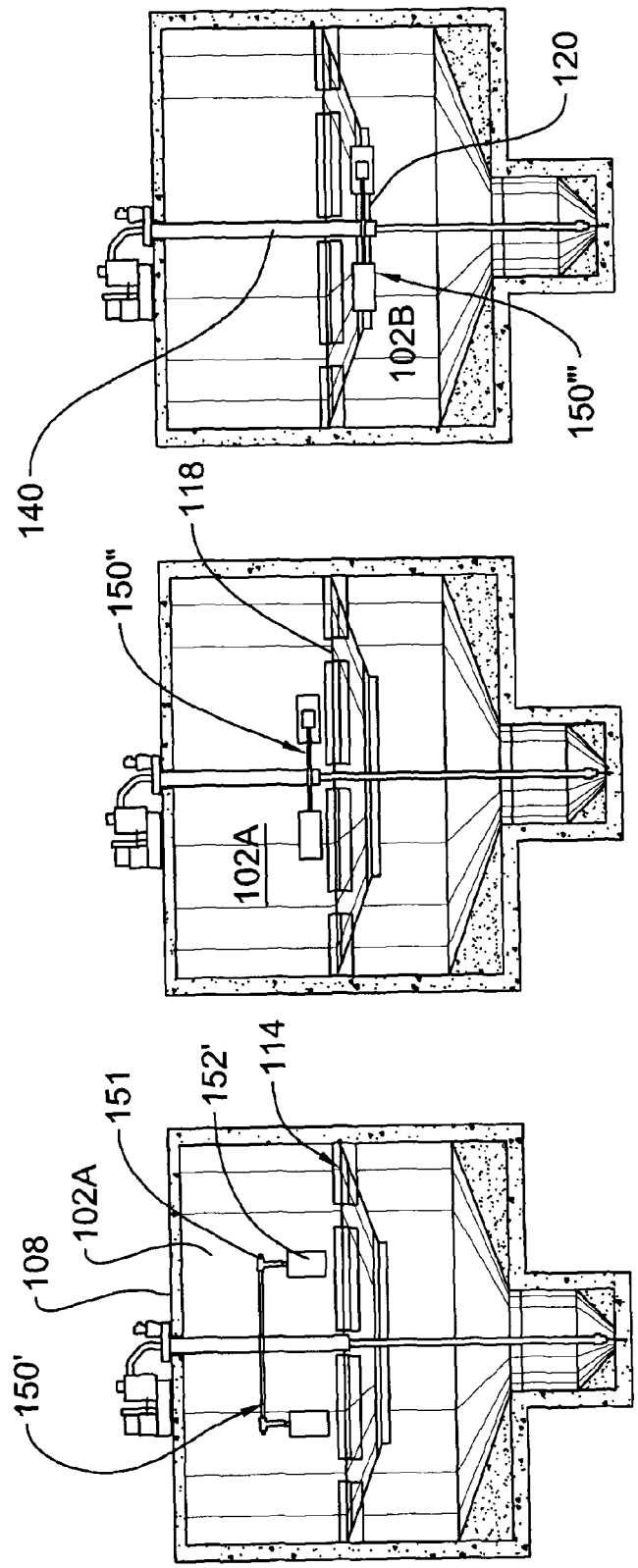

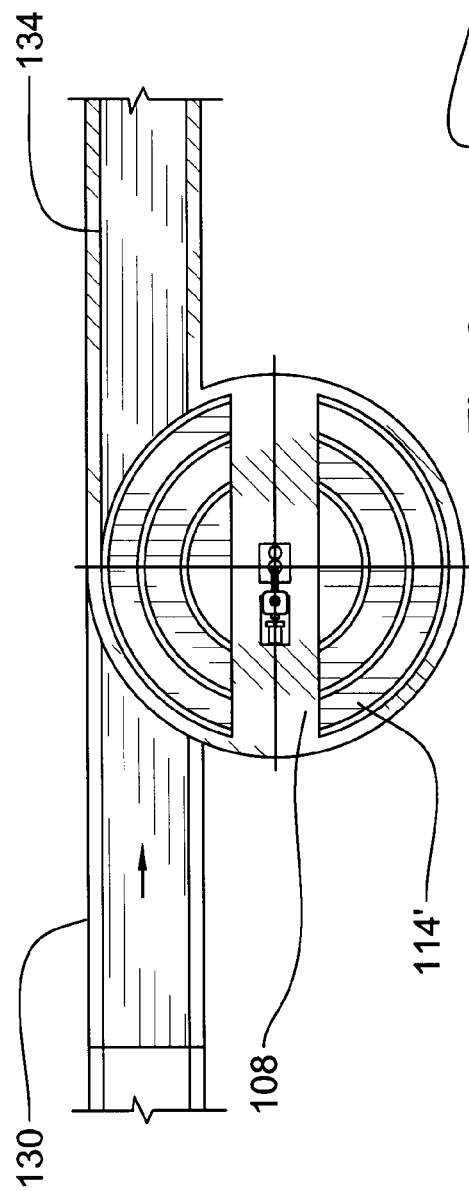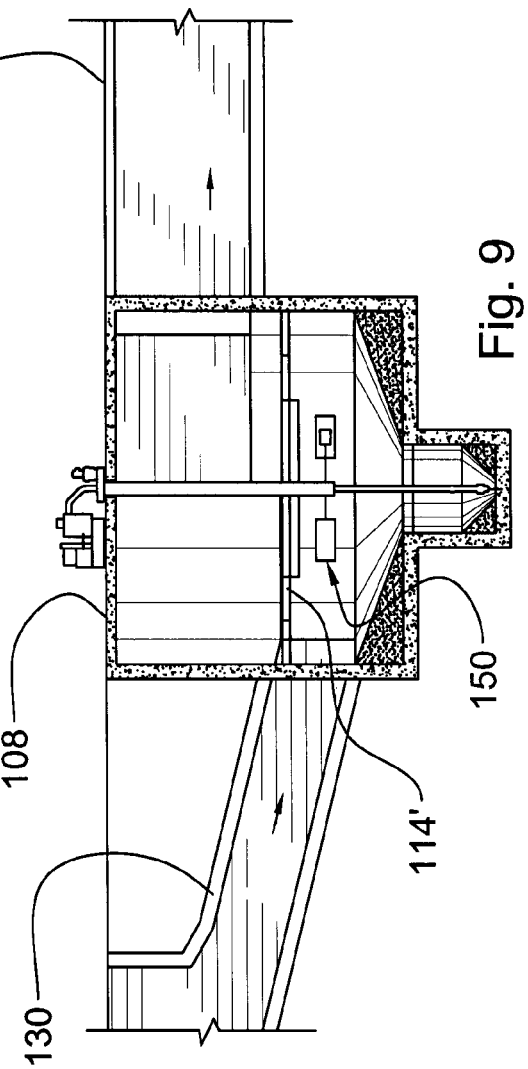

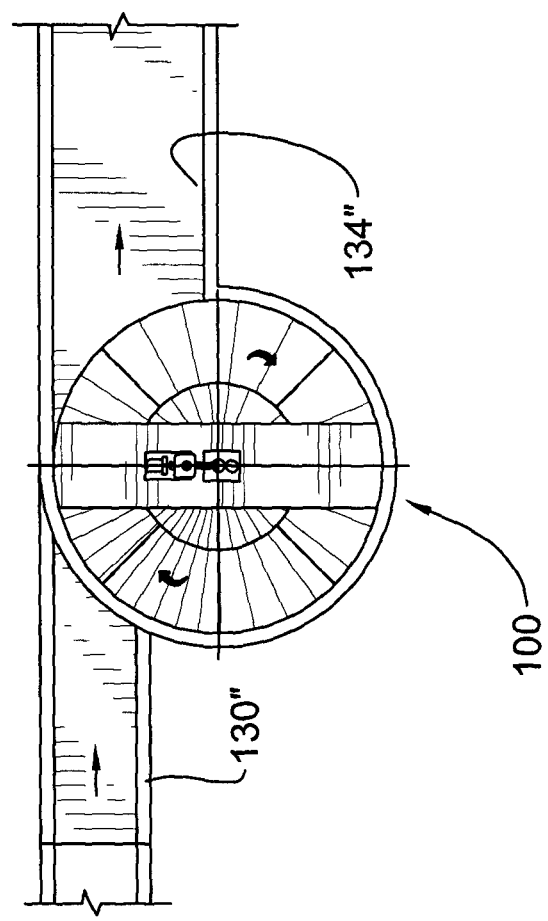
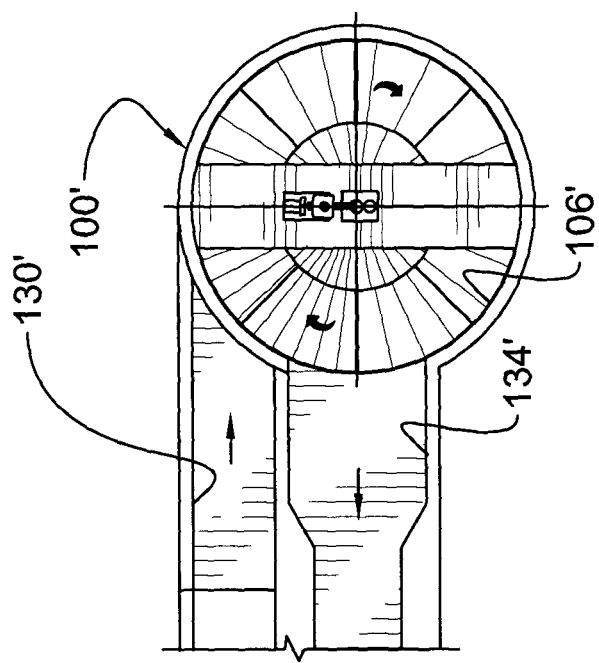
Fig. 11
Fig. 10

METHOD AND APPARATUS FOR SEWAGE GRIT REMOVAL

CROSS-REFERENCE DATA

This application claims the conventional priority of U.S. Provisional patent application No. 61/200,560 filed on Dec. 1, 2008.

BACKGROUND OF THE INVENTION

In sewage treatment plants, heavy mineral matter called "grit," forms part of the fluids that need to be processed and segregated from other fluid material. Grit is principally made up of sand and soil, but can also contain cinders, coffee grounds, seeds, corn, and other coarse sediments. As grit cannot be treated, reduced in size or eliminated by treatment methods, it needs to be physically removed. Grit presents a problem to wastewater treatment as it is hard and abrasive; it wears pumps and other mechanical devices; it is heavy and accumulates in clarifiers, treatment basins, digesters, et al, where it must often be removed by hand.

U.S. Pat. No. 4,767,532 issued in Aug. 30, 1988 to Smith & Loveless inc., discloses a grit selector having an upper settling chamber and a lower grit storage chamber. The settling chamber communicates with the grit storage chamber through an opening in a transition surface there between. An influent flume directs influent liquid directly into a lower portion of the settling chamber. An effluent flume withdraws effluent liquid from an upper portion of the settling chamber. The influent flume and effluent flume have a common centerline with the effluent flume being positioned at an elevation above the influent flume. A baffle member extends into the settling chamber for directing the influent liquid stream outwardly towards a lower portion of the periphery of the settling chamber. Influent fluid forcibly flows into the settling chamber in a tangential fashion, which induces rotational circulation inside the settling chamber. A rotating blade sustains the rotational circulation brought about initially by the incoming tangential fluid flow. Evacuation of sand and other grit material is done mainly under gravity into bottom grit pit, while water escape is performed once again under tangential flow bias.

A problem with such prior art grit removal apparatuses relates to design limitations in the orientation and size of the effluent flume liquid flow channel exiting from the apparatus settling chamber, compared to the influent flume liquid sewage flow channel. In particular, design borne flow load limitations require that:

1. the inner diameter of the effluent flume flow channel be substantially the same as the inner diameter of the influent flume flow channel; and
2. the general orientation and flow direction of the effluent flume flow channel be the same as that of the influent flume flow channel, i.e. no angular deviation (e.g. a right angle deviation) from the flow direction of the influent flume flow channel is allowed relative to the flow direction of the effluent flume flow channel, for the prior art grit removal apparatus to remain operational.

SUMMARY OF THE INVENTION

The invention relates to an apparatus for separating grit from liquid sewage while retaining organic solids in suspension including inlet means for admitting liquid sewage into the apparatus, outlet means for removing liquid from which grit has been separated from the apparatus, and means for removing separated grit from the apparatus, the apparatus further comprising:—a cylindrical grit settling main chamber defining a bottom end portion, a top end and a peripheral wall;—a grit storage secondary chamber positioned below the main chamber bottom end portion such that grit settling out of the liquid will settle into said secondary chamber, said secondary chamber including a central grit settling access top mouth opening through said main chamber bottom end portion;—a vertical shaft positioned centrally in said main chamber and in said secondary chamber, said shaft having a longitudinal axis;—means for causing rotation of said vertical shaft about said longitudinal axis;—a partition extending transversely through said main chamber intermediate said top end and said bottom end thereof spacedly therefrom wherein an upper subchamber is formed in said main chamber above said partition and a lower subchamber is formed in said main chamber below said partition, said liquid sewage inlet means in direct fluid communication with said lower sub-chamber, said liquid outlet means in direct fluid communication with said upper sub-chamber, said partition having a peripheral edge integrally mounted in substantially fluid tight fashion to said peripheral wall of said main chamber; said partition including a bottom central aperture housing said shaft, said partition bottom central aperture being spaced from said shaft to define an annular opening between said shaft and said partition to provide for upward flow of liquid from said lower subchamber to said upper subchamber; and mechanical means positioned within said main chamber and enabling sustained rotational liquid sewage first fluid flow within said lower subchamber, enabling inducing upward liquid second fluid flow from said lower subchamber through said partition annular opening and into said upper subchamber, and enabling sustaining rotational liquid third fluid flow within said upper subchamber for escape through said outlet means, wherein a fluid flow speed gradient is established between said third fluid flow and said first fluid flow.

According to one embodiment, said fluid flow speed gradient is preferably such that said third fluid flow is at substantially smaller speed than said first fluid flow, with said third fluid flow speed being preferably about four times smaller than that of said first fluid flow.

According to one embodiment, said mechanical means for causing said second fluid flow and said third fluid flow includes a plurality of vanes fixed to said shaft and rotatable therewith, said vanes located within said lower subchamber; wherein said fluid flow speed gradient enables omnidirectional radial or tangential escape flow of the liquid from which grit has been separated from said upper subchamber through said outlet means, and furthermore accommodates differential fluid flow loads between said inlet means and said outlet means.

According to an alternate embodiment, said vanes are located within said upper subchamber.

According to one embodiment, said partition is a downwardly convex cone with a diametrally smaller bottom mouth and a diametrally larger top mouth. Preferably, the bottom mouth diameter of said conical partition represents between 40 and 60% of the diameter of said conical partition top mouth, and preferably about 50% thereof. The angular slope of said conical partition could range between 15° and 30°, with optimal value at 20°.

The main chamber bottom end portion is preferably funnel shaped with an angular slope substantially matching that of said conical partition, preferably having an angular slope of about 20°.

In one embodiment, said inlet means includes an access port made in said lower sub-chamber peripheral wall and opening into said lower subchamber, and a liquid sewage supply channel tangentially projecting from said lower subchamber, said supply channel having an angular slope ranging between 10° and 30° (optimal value being 15° relative to a plane at right angle to said lower subchamber peripheral wall.

Alternately, said partition is a flat panel.

Alternately, said vanes are circumscribed within said funnel shaped main chamber bottom end portion and mounted to a registering portion of said shaft.

The invention also relates to a method for removing grit from liquid sewage while retaining organic solids in suspension including inlet means for admitting liquid sewage into the apparatus, outlet means for removing liquid from which grit has been separated from the apparatus, and means for removing separated grit from the apparatus, the method comprising the following steps:—providing a cylindrical grit settling main chamber defining a bottom end, a top end and a peripheral wall, a grit storage secondary chamber positioned below the main chamber such that grit settling out of the liquid will settle into said secondary chamber, said secondary chamber including a peripheral wall having an upper mouth; a vertical shaft positioned centrally in said main chamber and in said secondary chamber, said shaft having a longitudinal axis;—causing rotation of said vertical shaft about said longitudinal axis;—providing a partition extending transversely through said main chamber intermediate said top end and said bottom end thereof spacedly from said secondary chamber wherein an upper subchamber is formed in said main chamber above said partition and a lower subchamber is formed in said main chamber below said partition, wherein said liquid sewage inlet means is in fluid communication with said lower sub-chamber, and said liquid outlet means is in fluid communication with said upper sub-chamber, said partition having a peripheral edge integrally mounted to said peripheral wall of said main chamber; said partition including a bottom central aperture housing said shaft, said bottom aperture being spaced from said shaft to define an annular opening between said shaft and said partition to provide for upward flow of liquid from said lower subchamber to said upper subchamber;—generating sustained rotational liquid sewage first fluid flow within said lower subchamber;—inducing vertical upward liquid second fluid flow from said lower subchamber through said partition annular opening and into said upper subchamber;—sustaining rotational liquid third fluid flow within said upper subchamber for escape through said outlet means; and—generating a fluid flow speed gradient between said third fluid flow and said first fluid flow.

Preferably, the step of generating a fluid flow speed gradient between said third fluid flow and said first fluid flow, is of such a degree that about a 75% decrease in speed of third fluid flow is achieved relative to that of said first fluid flow.

Preferably, there is further included the step of radial liquid escape from said upper subchamber through said outlet means.

BRIEF DESCRIPTION OF THE DRAWINGS

FIG. 1 is a top plan view of an embodiment of grit removing apparatus according to the present invention;

FIGS. 2-4 are elevational views from three different perspectives of the apparatus of FIG. 1;

FIGS. 7A, 7B and 7C are views similar to FIG. 2 but at an enlarged scale and showing three different alternate fluid propeller mountings on the vertical shaft relative to the conical partition;

FIGS. 8 and 9 are a top plan view similar to FIG. 1 and an elevational view similar to FIG. 3, but showing an alternate embodiment of the invention where the partition is a flat panel;

FIGS. 10 to 13 are views similar to FIG. 1, but at a larger scale and showing four different alternate orientations of liquid outlet means channels enabled by the present design of grit removal apparatus;

DETAILED DESCRIPTION OF THE INVENTION

Figure 5:
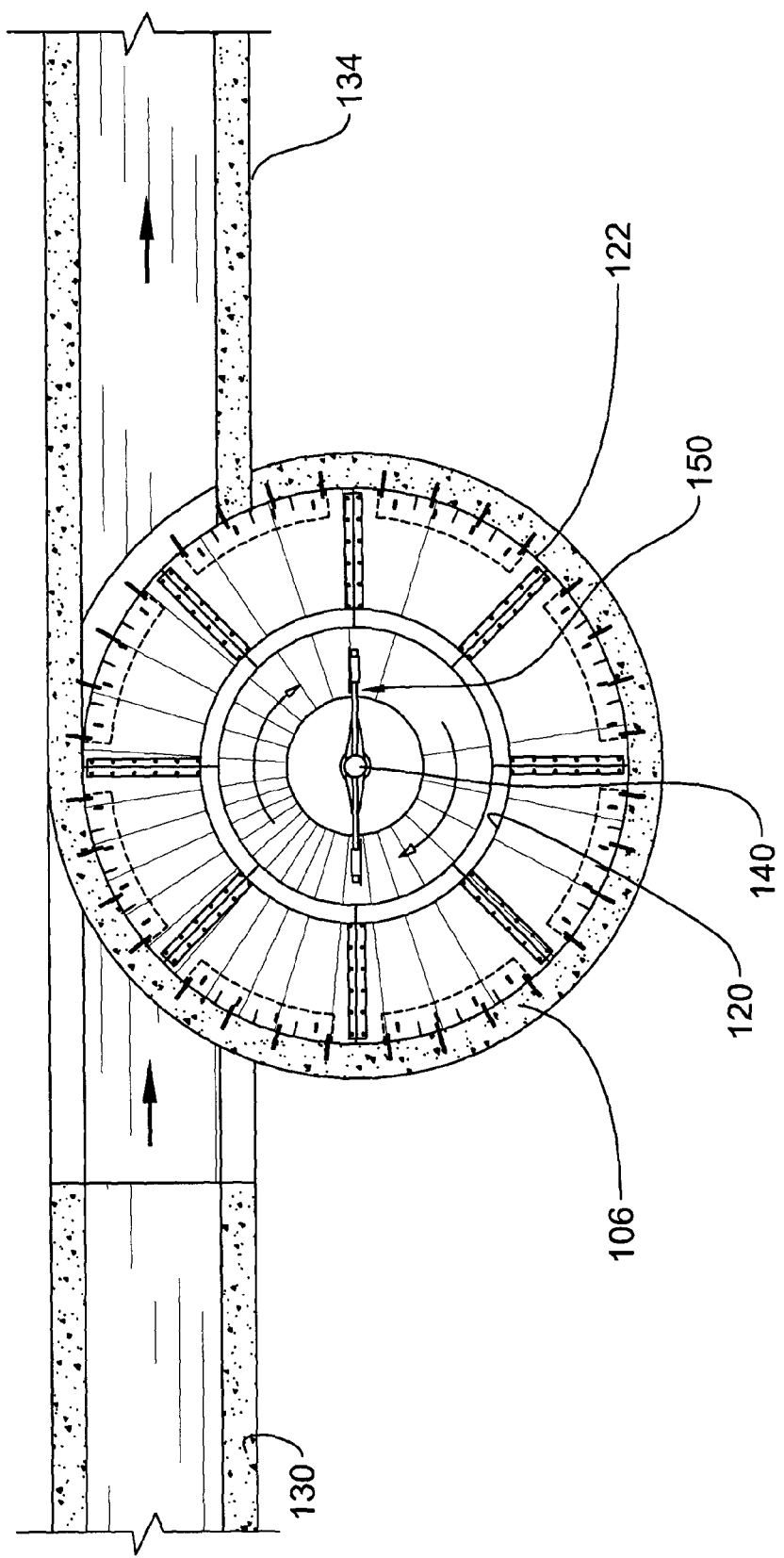
FIGS. 5-6 are enlarged views of FIGS. 1 and 3, respectively, showing further detail.

FIGS. 1-6 and 14 show a first embodiment of apparatus for separating grit from incoming grit sewage, 100. Apparatus 100 includes a main cylindrical settling chamber 102, disposed immediately above and concentric to a lower diametrally smaller secondary cylindrical grit storage chamber 104. The bottom grit storage chamber 104 is for storing grit removed under centrifugal and gravity forces from the grit sewage fluid having engaged the settling chamber 102. Chamber 102 defines an upright peripheral wall 106, a top wall 108 and a bottom wall 110. A funnel shape flooring 112 is mounted above bottom wall 110, with the diametrally smaller bottom mouth 112A of funnel shape flooring 112 registering with and opening into grit storage chamber 104 through a corresponding aperture 110A in flooring 110, and with the diametrally larger top mouth 112B thereof merging with wall 106. Preferably, the slope of funnel shape flooring 112 ranges between 15° to 30°, and most preferably is about 20° for optimal value.

In the preferred embodiment of FIGS. 1-6 and 14, a downwardly convex conical partition 114 is mounted into main chamber 102 spacedly above flooring 112 and below main chamber top wall 108. Conical partition 114 defines a main conical body 116, with a top annular flange 118 and a bottom mouth 120 circumscribed by a bottom annular rim 122. Preferably, the diameter of the partition bottom mouth 120 ranges between 40% and 60% of that of top flange 118, with optimal value being about 50%.

Top flange 118 is fixedly connected in substantially fluid tight fashion to upright wall 106, wherein bottom mouth 120 forms a plane generally orthogonal to the main chamber upright wall 106. However, for practical purposes, a functional tolerance of a few millimeters between the partition top flange 118 and the main chamber upright wall 106 may be found to be operationally acceptable for mounting purposes.

Preferably, the slope of conical body 116 matches that of funnel shape flooring 112, with an optimal value of about 20°. A greater angular conicity of the conical partition 114, for example of between 30° to 45°, could theoretically be effective, however that would create substantial increase in grit removal device size and thus in fixed costs, that would reduce or eliminate the cost-savings associated with the improved grit removal capability.

Accordingly, an upper subchamber 102A is formed between the conical body 116 of partition 114 and the top wall 108 of main chamber 102, and a lower subchamber 102B is formed between the conical body 116 of partition 114 and the funnel shaped flooring 112 of chamber 102, wherein subchambers 102A and 102B come in fluid communication only through radially inward bottom mouth 120 of conical partition 114. Attachment brackets 122 are fixedly provided edgewisely on flange 118 and are anchored to wall 102 by anchor fasteners 124 in substantially fluid tight fashion with elastomeric strips 126 lodged into a peripheral cavity 122A of brackets 122.

It is thus understood that conical partition 114 is sized and shaped relative to grit settling chamber 102 in such a fashion as to restrict all vortex induced upward flow of partially grit-removed water to a water flow only partition bottom central mouth 120. Water partially purged from grit is not allowed to flow upwardly between the sealed peripheral edge portion of conical partition 114 and the peripheral inner wall 106 of settling chamber 102, so that all water flow between sub-chambers 102A and 102B occur only through central bottom mouth 120.

A fluid intake port 128 transversely opens through upright wall 106 and into lower subchamber 102B. A liquid sewage intake channel 130 opens at one end into intake port 128, for ingress into subchamber 102B of liquid sewage. Channel 130 tangentially intersects the lower portion of main settling chamber wall 106 so as to cause the incoming influent sewage liquid to flow tangentially into lower subchamber 102B. A centrifugal force is generated for the sewage fluid engaging inside cylindrical lower subchamber 102B, which brings about sewage fluid forcibly radially outwardly against the interior wall of chamber 102B.

Channel 130 has at is upstream end a generally horizontal main feeder segment 130A, connecting with channel 130 via an intermediate downwardly inclined elbowed section 130B, wherein channel 130 forms a non-orthogonal angular value with wall 106. Preferably, the angular value of channel section 130 relative to a plane orthogonal to wall 106 ranges between 10° and 30°, and most preferably having an optimal value of 15°. Accordingly, liquid sewage is designed to flow through inlet port 128 and into subchamber 102B at a substantial flow speed. The diametral size of fluid inlet port 128 is preferably substantially equal to the distance between top flange 118 of conical partition 114 and the top mouth 112B of funnel shape flooring 112.

A fluid outlet port 132 transversely open through upright wall 106 and into upper subchamber 102A. A liquid channel 134 transversely opens at one end into fluid outlet port 132, for outflow escape of liquid separated from grit from upper subchamber 102A and into channel 134. As suggested in FIG. 6, the inner diameter of liquid outflow channel 134 may be substantially larger than that of fluid intake channel 130 and may remain in the same general direction than the latter in this operational design.

Alternately, as suggested by the embodiment of FIG. 10, liquid outflow channel 134' of grit removal apparatus 100' may operationally become reoriented by 180° relative to the direction of intake channel 130. Moreover, as also illustrated in FIG. 10, the liquid outflow channel 134' need not escape tangentially from wall 106', as with the previous embodiment, but may escape radially therefrom and for example in parallel counterflow fashion to channel 130 while grit removing apparatus 100' remains fully operational.

Figure 13:
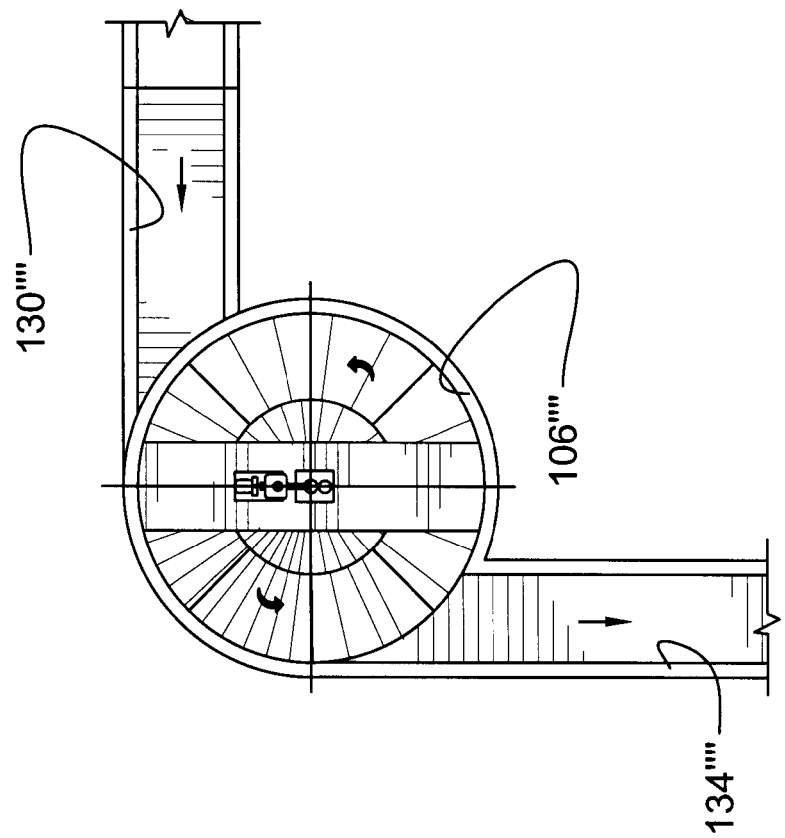
Figure 12:
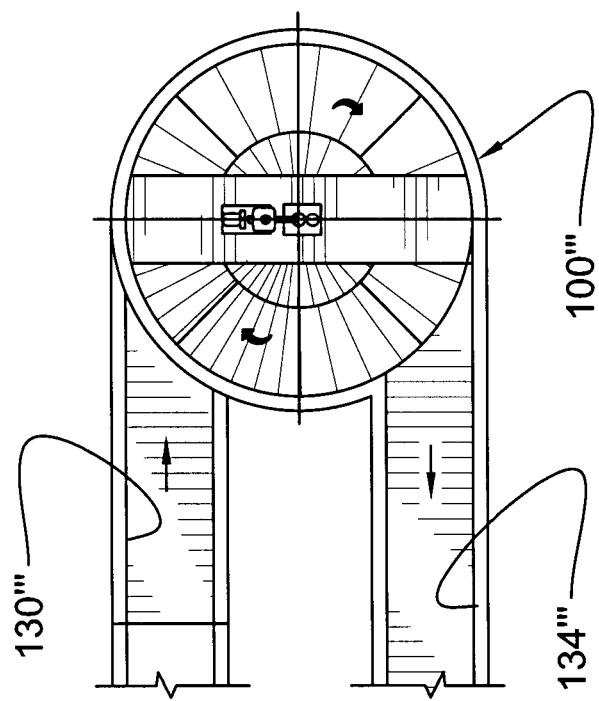
Figure 14:
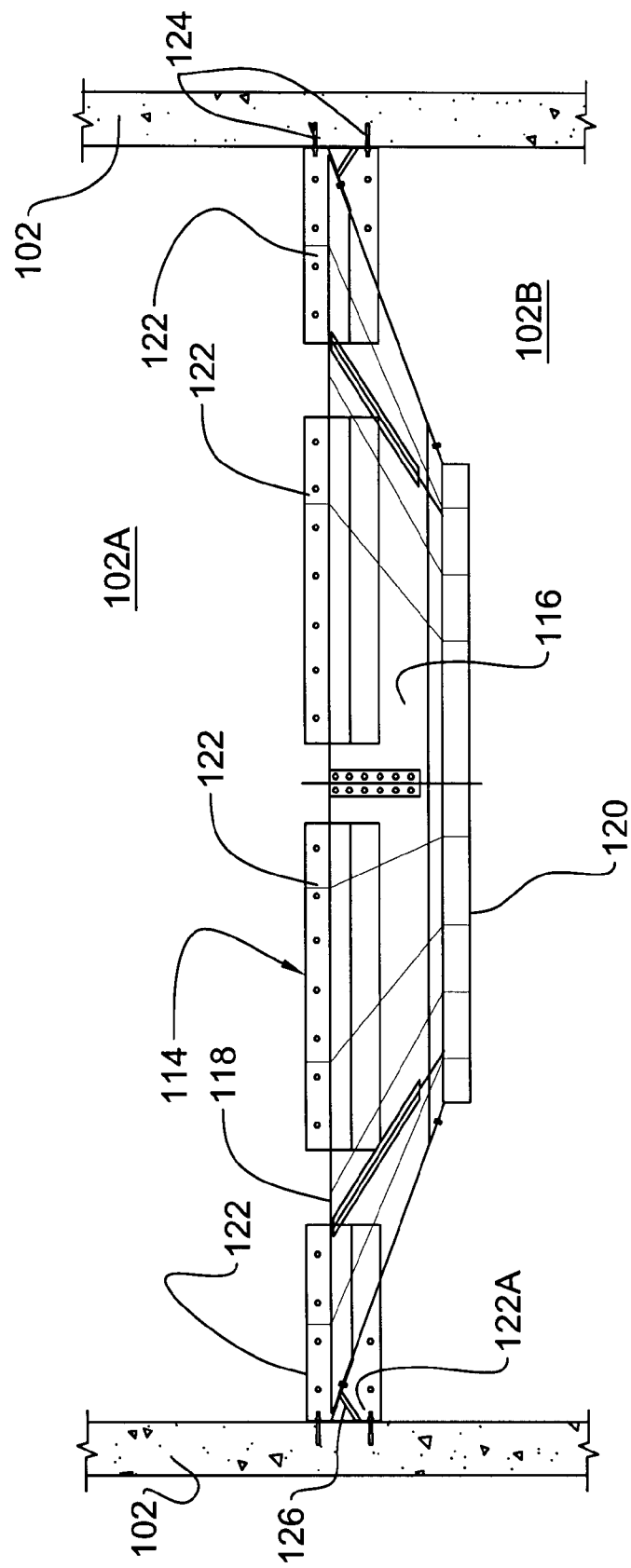
FIG. 14 is an enlarged cut-out view of the central section of FIG. 6, showing how the conical partition is fixedly connected to the peripheral wall of the main grit settling chamber.

Still alternately, as suggested by the embodiment of FIG. 11, channels 130", 134" of grit removal apparatus 100" may be coaxial. The alternate operational embodiment of FIG. 12 is similar to FIG. 10, except that the channels 130''', 134''' of grit removal apparatus 100''' have substantially same inner diameter. The alternate embodiment of grit removal apparatus 100'''' of FIG. 13 shows a operational design where the liquid outlet channel 134'''' escapes tangentially from main chamber wall 106'''' at right angle relative to the direction of sewage intake channel 130''''.

A hollow shaft 140 is mounted in upright condition within main chamber 102, defining a top end portion 140A journalled into top wall 108 through an aperture 108A, and sized so that its bottom end mouth 108B open freely into grit storage chamber 104 in such a way as to be able to reach most of the grit material sedimentation therein. Shaft 140 extends freely through mouths 118 and 120 of conical partition 114. A motor 142 carried over wall 108 is operatively connected to shaft 140 and drives same into rotation. The gear box of the shaft motor 142 will preferably be manufactured from a heavy bearing support plate and structural members. It shall be designed so that the gears and bearings be easily grease lubricated. The lower portion of the case could be closed with an anti-splash plate. The gear case could include a pinion mounted directly on the gear motor's output shaft and riding on for example a 495 mm pitch diameter slewing ring having external gearing. Preferably, the motor 142 is of the constant speed type, but could alternately be of the variable speed type.

A fluid pump 144 is also carried by top wall 108 adjacent motor 142, and is operatively connected to hollow shaft 140 and generates negative pressure therein for upwardly pulling grit material from grit storage chamber 104 through the hollow of shaft 140 and outwardly at the top mouth of shaft 140 to a channel 146 leading to an external refuse collector. Operation of fluid pump 144 may be cyclical, for example 15 minutes each hour.

A multibladed propeller 150 having a number of peripherally mounted blades 152 is transversely fixedly mounted onto shaft 140 for rotation about a vertical axis centered in settling chamber 102. In the preferred embodiment of FIG. 6, propeller 150 is mounted into lower subchamber 102B, above funnel shape flooring top mouth 112B and below the bottom mouth 120 of conical partition 114, in transverse register with the fluid inlet port 128, wherein the liquid sewage flow from channel 130 is directed tangentially toward the propeller blades 152. Preferably, propeller 150 is sized so that it diametrally matches the diameter of conical partition bottom mouth 120. The size of the partition mouths 118 and 120 should be such as to allow manual access to propeller 150 by removal of top wall 108 of main chamber 102. The blades 152 are mounted in slightly tilted fashion, for example by about 30° relative to the horizontal plane.

Figure 6:
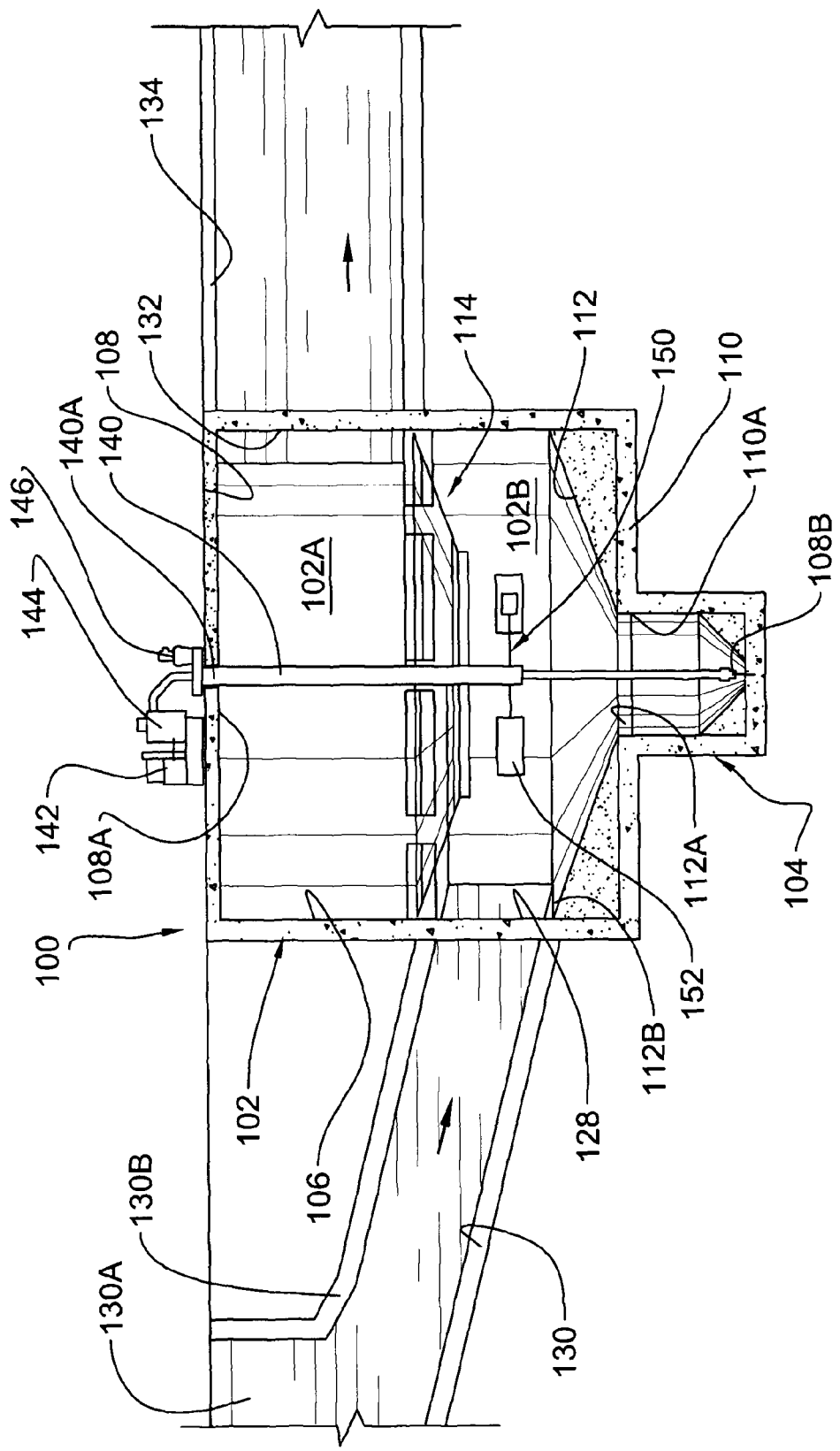
Figure 15:
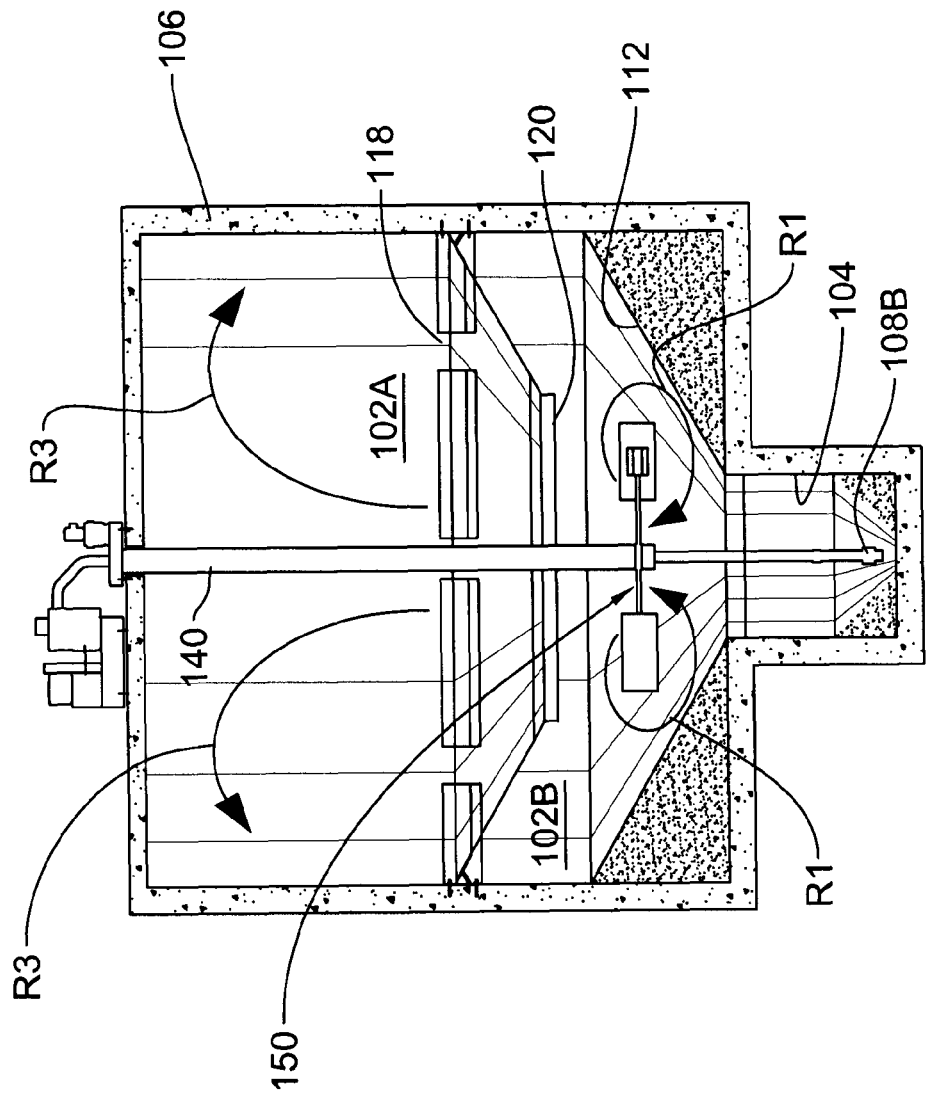
FIG. 15 is a view similar to FIG. 7A, but at a slightly enlarged scale and further showing an embodiment of the invention where the propeller blades are mounted within the funnel of the settling chamber bottom floor.
Figure 16:
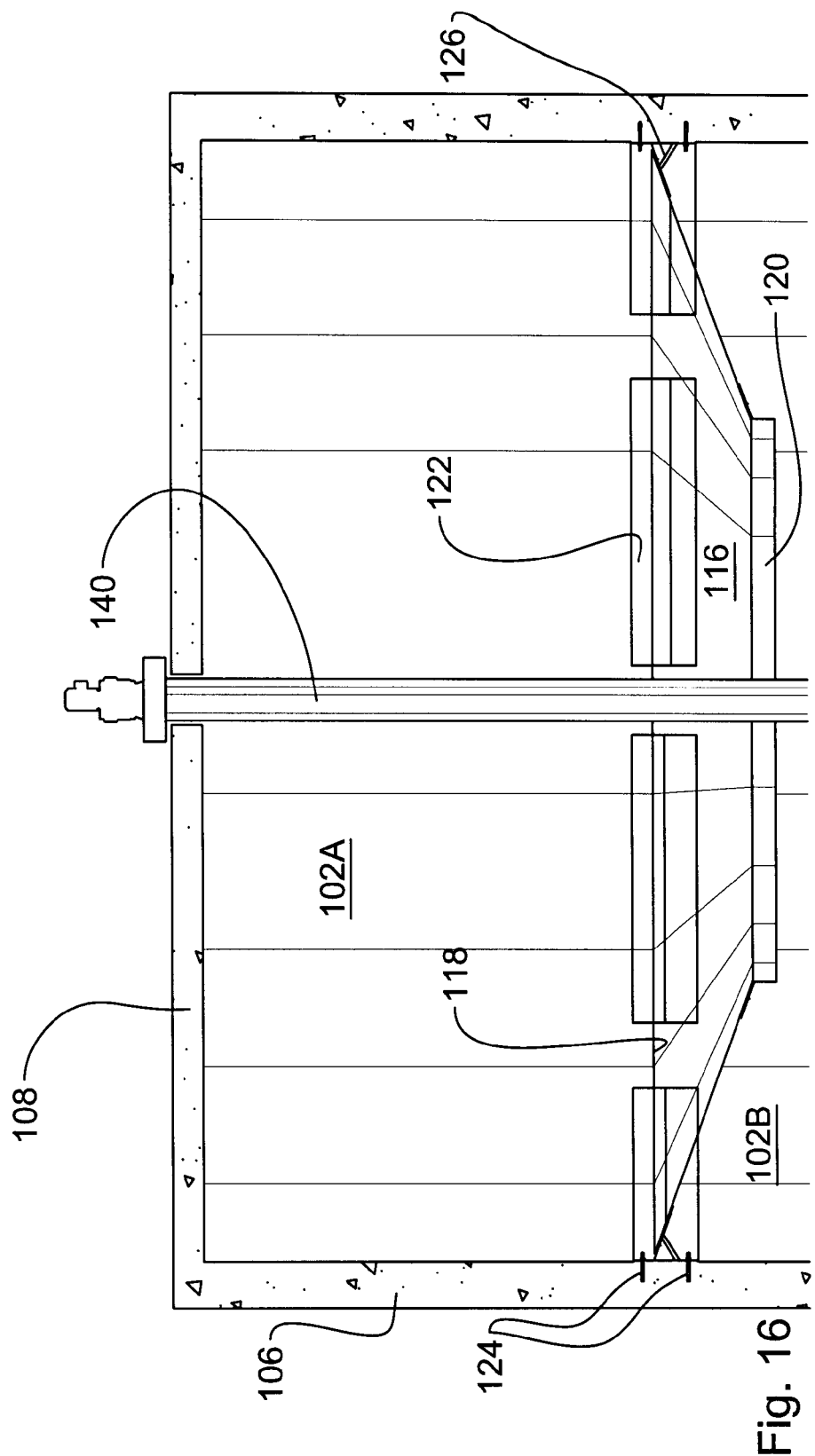
FIG. 16 is a view similar to FIG. 14, but further showing the shaft mounting to the top end of the grit settling chamber.

The preferred embodiment of grit removal apparatus 100 shown in FIG. 6 operatively enables the various angular tangential or radial mountings of the liquid outlet channel 134, in view in particular of the location of the propeller 150 being located in the lower subchamber 102B. The propeller 150 thus induces a turbine effect in the lower subchamber 102B, generating a rising central vortex (along arrows R1 in FIG. 15). In a rising vortex, the liquid part of the fluid rises along arrows R2 in FIG. 15) but the coarse solids slide toward the bottom along the downwardly inwardly inclined slope of the funnel shape flooring 112 toward the grit storage chamber 104. The tangential speed of the blades 152 of rotating propeller 150 should preferably be the same as that of the liquid sewage flow coming from the inlet channel 130, for example by about one meter per second flow speed and 1.2 cubic meter per second flow volume. Alternately, the propeller 150 may rotate at a greater speed than that of the sewage flow from the inlet channel 130, for example up to several times the sewage flow speed from inlet channel 130, while still remaining at least partially effective to enhance the rising vortex motion of not only the liquid part but also the organic solids having a lower density than sand (e.g., corn particles). Coarse particles may rotate for example 5 to 6 times or more in the lower sub-chamber 102B, before escaping upwardly through the conical partition mouths 118 and 120 toward and into the upper subchamber 102A, (arrows R3 in FIG. 15) and one important function of the propeller 150 is to provide optimization of this rising vortex fluid motion. The direction of rotation of propeller 150 should be in the same direction as the sewage liquid flow direction.

FIGS. 7A, 7B and 7C show alternate mountings for propeller 150.

In the embodiment of FIG. 7A, propeller 150' is mounted within upper subchamber 102A, above conical partition 114 and below top wall 108. Propeller 150' includes rocker mountings 151 for each of the blades 152', with said rocker mountings 151 enabling partial radially outward tilting of the blades 152' from a stationary downwardly extending condition (as illustrated) to a partly radially outwardly extended operative condition, for example by up to 60° from the horizontal plane. The purpose of such blade rocker mountings 151 is to mitigate drag inertia at the start of the operating cycle, and accordingly, such blade rocker mountings 151 can operate only in an environment corresponding to the upper subchamber 102A. In this embodiment of FIG. 7A, the speed gradient between the upper subchamber 102A and the lower subchamber 102B is substantially smaller than with the embodiment of FIG. 6 where the propeller is mounted within the lower subchamber 102B. The embodiment of grit removal apparatuses of FIGS. 10-13 are therefore not suitable for use with the propeller mounting of FIG. 7A.

In the second embodiment of FIG. 7B, propeller 150" is again mounted into upper subchamber 102A, with similar limitations as with FIG. 7A, but now substantially coplanar to the top flange 118 of conical partition 114.

In the third embodiment of FIG. 7C, propeller 150''' is mounted into lower subchamber 102B, but now substantially with the bottom mouth 120 of conical partition 114. Limitations as to speed gradients are similar to those of FIG. 7A.

Figure 17:
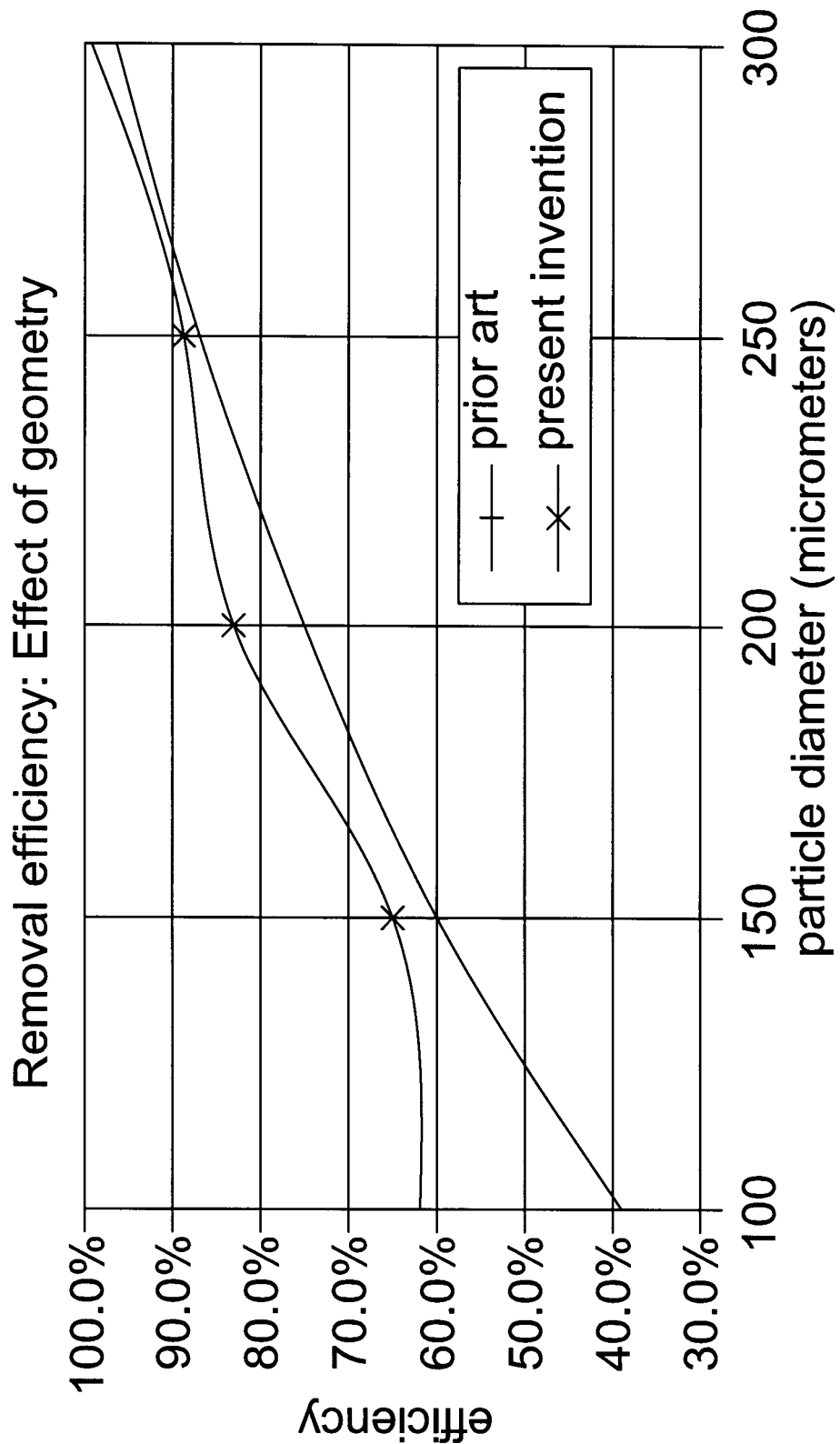
FIG. 17 is a comparative efficiency graph showing the performance of the present grit removal apparatus relative to increasing grit particle size, compared to prior art apparatuses.

As suggested by computer generated fluid dynamic simulation graph illustrated in FIG. 17 of the drawings, it has been found that improved efficiency—of the order of 10 to 15%—in grit removal capability relative to prior art grit removal apparatuses, can be obtained with such a grit removal apparatus of the present invention, in particular with the embodiment having a downwardly conical partition 114 and a propeller 150 mounted intermediately into the lower subchamber 102B. The efficiency level relates to the difference in grit content in the influent channel, as compared to that in the effluent channel.

Alternately, and as illustrated in FIGS. 8-9 of the drawings, the partition 114' could be planar, instead of conical, but at a cost of added structural construction difficulty but still unexpected improvement of efficiency compared to prior art, namely, of about 10 to 15% improved efficiency relative to prior art grit removal devices. When the partition is conical, 114, a substantial unexpected 10 to 15% improvement in efficiency is achieved compared to prior art grit removal apparatuses. An important consideration here is to have a new partition mounted into a grit removal device settling chamber that separates the main settling chamber 102 into two sub-chambers 102A and 102B: a lower sub-chamber 102B, into which the water and grit sewage influent engages; and an upper sub-chamber 102A, from which escapes the partially grit-removed water, wherein substantially all water flow from the lower sub-chamber to the upper sub-chamber is enabled through the central mouths 118 120, only of the partition 114.

It has been found that unexpectedly, a fluid flow speed gradient is established between the liquid flow inside the upper subchamber 102A and the liquid flow inside the lower subchamber 102B. In particular, when the propeller 150 is located within the lower subchamber 102B, optimal results are achieved wherein the fluid flow speed gradient enables omnidirectional radial or tangential escape flow of the liquid from the upper subchamber 102A through the outlet port 132, and furthermore accommodates differential fluid flow loads between the inlet channel 1309 and outlet channel 134. For optimal values, the fluid flow speed gradient is such that the fluid flow speed inside the upper subchamber 102A (arrows R3 in FIG. 15) is about four times smaller than that of the fluid flow speed inside the lower subchamber 102B (arrows R1 in FIG. 15). It is further noted that this speed gradient promotes final gravity-borne sedimentation of sand particles which may have accidentally escaped into upper subchamber 102A, through the rising vortex and through the partition central mouths 118, 120, thus still further enhancing the grit separation effect sought with the present apparatus 100.

It is also noted that the present apparatus 100 easily accommodates up to 25% increase in sewage fluid flow speed relative to constant speed of propeller 150, without significant decrease in grit removal operational efficiency or without significant backflow. The present apparatus has high adaptability to accidental fluctuations in fluid flow parameters or liquid outflow configurations.

Another improvement over prior art grit removal apparatuses relates to fluid level controls inside the main grit settling chamber 102. In the prior art apparatus, such control was critical in view of avoiding substantial decrease in effectiveness. However, in the present invention apparatus, fluid level control in the main grit settling chamber 102 is far less important.

The present grit removal apparatus should be able to provide the following performance:
a) removal of at least 95% of particulate grit equal to or greater than 300 micrometers in size;
b) removal of at least 85% of particulate grit equal to or greater than 210 micrometers in size; and most importantly,
c) removal of at least 65% of particulate grit equal to or greater than 150 micrometers in size.

The present grit removal apparatus is particularly well suited for wastewater treatment plants, but is not limited thereto.

We claim:

1. Apparatus for separating grit from liquid sewage while retaining organic solids in suspension including inlet means for admitting liquid sewage into the apparatus, outlet means for removing liquid from which grit has been separated from the apparatus, and means for removing separated grit from the apparatus, the apparatus further comprising:
a cylindrical grit settling main chamber defining a bottom end portion, a top end and a peripheral wall;
a grit storage secondary chamber positioned below the main chamber bottom end portion such that grit settling out of the liquid will settle into said secondary chamber, said secondary chamber including a central grit settling access top mouth opening through said main chamber bottom end portion;

a vertical shaft positioned centrally in said main chamber and in said secondary chamber, said shaft having a longitudinal axis;

means for causing rotation of said vertical shaft about said longitudinal axis;

a partition extending transversely through said main chamber intermediate said top end and said bottom end thereof spacedly therefrom wherein an upper subchamber is formed in said main chamber above said partition and a lower subchamber is formed in said main chamber below said partition, said liquid sewage inlet means in direct fluid communication with said lower subchamber, said liquid outlet means in direct fluid communication with said upper subchamber, said partition having a peripheral edge integrally mounted in substantially fluid tight fashion to said peripheral wall of said main chamber; said partition including a bottom central aperture housing said shaft, said partition bottom central aperture being spaced from said shaft to define an annular opening between said shaft and said partition to provide for upward flow of liquid from said lower subchamber to said upper subchamber; and mechanical means positioned within said main chamber, said mechanical means enabling a sustained rotational liquid sewage first fluid flow within said lower subchamber, said mechanical means enabling an induced upward liquid sewage second fluid flow from said lower subchamber through said partition annular opening and into said upper subchamber, and said mechanical means enabling a sustained rotational liquid sewage third fluid flow within said upper subchamber for escape through said outlet means, wherein a fluid flow speed gradient is established between said liquid sewage third fluid flow and said liquid sewage first fluid flow.

2. An apparatus for removing grit as in claim 1, wherein said fluid flow speed gradient is such that said third fluid flow is at substantially smaller speed than said first fluid flow.

3. An apparatus for removing grit as in claim 2, wherein said mechanical means includes a plurality of vanes fixed to said shaft and rotatable therewith, said vanes located within said upper subchamber.

4. An apparatus for removing grit as in claim 2, wherein said partition is a flat panel.

5. An apparatus for removing grit as in claim 2, wherein said mechanical means includes a plurality of vanes fixed to said shaft and rotatable therewith, said vanes located within said lower subchamber; wherein said fluid flow speed gradient enables omnidirectional radial and or tangential escape flow of the liquid from which grit has been separated from said upper subchamber through said outlet means, and furthermore accommodates differential fluid flow loads between said inlet means and said outlet means.

6. An apparatus for removing grit as in claim 5, wherein said fluid flow speed gradient is such that said third fluid flow speed is about four times smaller than that of said first fluid flow.

7. An apparatus for removing grit as in claim 5, wherein said partition is a downwardly convex cone, defining a diametrally larger top mouth and a diametrally smaller bottom mouth.

8. An apparatus for removing grit as in claim 7, wherein said conical partition bottom mouth diameter is about 5% that of said conical partition top mouth.

9. An apparatus for removing grit as in claim 7, wherein the diameter of said conical partition bottom mouth represents between 40 and 60% of the diameter of said conical partition top mouth.

10. An apparatus for removing grit as in claim 6, wherein the angular slope of said conical partition ranges between 15° and 30°.

11. An apparatus for removing grit as in claim 10, wherein said angular slope of said conical partition is about 20°.

12. An apparatus for removing grit as in claim 10, wherein said fluid flow speed gradient is such that said third fluid flow speed is about four times smaller than that of said first fluid flow.

13. An apparatus for removing grit as in claim 7, wherein the angular slope of said conical partition ranges between 15° and 30°.

14. An apparatus for removing grit as in claim 13, wherein said main chamber bottom end portion is funnel shaped with an angular slope of about 20°.

15. An apparatus for removing grit as in claim 13, wherein said main chamber bottom end portion is funnel shaped with an angular slope substantially matching that of said conical partition, said funnel shape bottom end portion defining a top end opening into said lower subchamber and a bottom end engaging with said secondary chamber top mouth.

16. An apparatus for removing grit as in claim 15, wherein said inlet means includes an access port made in said lower subchamber peripheral wall and opening into said lower subchamber, and a liquid sewage supply channel tangentially projecting from said lower subchamber, said supply channel having an angular slope ranging between 10° and 30° relative to a plane at right angle to said lower subchamber peripheral wall.

17. An apparatus for removing grit as in claim 16, wherein said supply channel angular slope is about 15°.

18. An apparatus for removing grit as in claim 15, wherein said vanes are circumscribed within said funnel shaped main chamber bottom end portion and mounted to a registering portion of said shaft.

19. An apparatus for removing grit as in claim 15, wherein said vanes are circumscribed within said conical partition bottom mouth and mounted to a registering portion of said shaft.

20. An apparatus for removing grit as in claim 15, wherein said vanes are circumscribed within said conical partition top mouth and mounted to a registering portion of said shaft.

21. Apparatus for separating grit from liquid sewage while retaining organic solids in suspension including inlet means for admitting liquid sewage into the apparatus, outlet means for removing liquid from which grit has been separated from the apparatus, and means for removing separated grit from the apparatus, the apparatus further comprising:

a cylindrical grit settling main chamber defining a bottom end portion, a top end and a peripheral wall;

a grit storage secondary chamber positioned below the main chamber bottom end portion such that grit settling out of the liquid will settle into said secondary chamber, said secondary chamber including a central grit settling access top mouth opening through said main chamber bottom end portion;

a vertical shaft positioned centrally in said main chamber and in said secondary chamber, said shaft having a longitudinal axis;

motorized means for causing rotation of said vertical shaft about said longitudinal axis;

a partition extending transversely through said main chamber intermediate said top end and said bottom end thereof spacedly therefrom wherein an upper subchamber is formed in said main chamber above said partition and a lower subchamber is formed in said main chamber below said partition, said liquid sewage inlet means in direct fluid communication with said lower subchamber, said liquid outlet means in direct fluid communication with said upper subchamber, said partition having a peripheral edge integrally mounted in substantially fluid tight fashion to said peripheral wall of said main chamber; said partition including a bottom central aperture housing said shaft, said partition bottom central aperture being spaced from said shaft to define an annular opening between said shaft and said partition to provide for upward flow of liquid from said lower subchamber to said upper subchamber; and mechanical means positioned within said main chamber, said mechanical means enabling a sustained rotational liquid sewage first fluid flow within said lower subchamber, said mechanical means enabling an induced upward liquid sewage second fluid flow from said lower subchamber through said partition annular opening and into said upper subchamber, and said mechanical means enabling a sustained rotational liquid sewage third fluid flow within said upper subchamber for escape through said outlet means, wherein a fluid flow speed gradient is established between said liquid sewage third fluid flow and said liquid sewage first fluid flow, wherein said mechanical means includes a plurality of vanes fixed to said shaft and rotatable therewith, said vanes located within said lower subchamber; wherein said fluid flow speed gradient enables omnidirectional radial or tangential escape flow of the liquid from which grit has been separated from said upper subchamber through said outlet means, and furthermore accommodates differential fluid flow loads between said inlet means and said outlet means.

22. An apparatus for removing grit as in claim 21, wherein said motorized means includes a constant speed motor operatively connected to said shaft.

23. An apparatus for removing grit as in claim 21, wherein said motorized means includes a variable speed motor operatively connected to said shaft.

24. A method for removing grit from liquid sewage while retaining organic solids in suspension including inlet means for admitting liquid sewage into the apparatus, outlet means for removing liquid from which grit has been separated from the apparatus, and means for removing separated grit from the apparatus, the method comprising the following steps:

providing a cylindrical grit settling main chamber defining a bottom end portion, a top end and a peripheral wall, a grit storage secondary chamber positioned below the main chamber bottom end portion such that grit settling out of the liquid will settle into said secondary chamber, said secondary chamber including a peripheral wall having a top mouth; a vertical shaft positioned centrally in said main chamber and in said secondary chamber, said shaft having a longitudinal axis;

causing rotation of said vertical shaft about said longitudinal axis;

providing a partition extending transversely through said main chamber intermediate said top end and said bottom end thereof spacedly from said secondary chamber wherein an upper subchamber is formed in said main chamber above said partition and a lower subchamber is formed in said main chamber below said partition, wherein said liquid sewage inlet means is in fluid communication with said lower sub-chamber, and said liquid outlet means is in fluid communication with said upper sub-chamber, said partition having a peripheral edge integrally mounted to said peripheral wall of said main chamber; said partition including a bottom central aperture housing said shaft, said bottom aperture being spaced from said shaft to define an annular opening between said shaft and said partition to provide for upward flow of liquid from said lower subchamber to said upper subchamber; and mechanical means positioned within said main chamber;

generating a sustained rotational liquid sewage first fluid flow within said lower subchamber using said mechanical means;

inducing a vertical upward liquid sewage second fluid flow from said lower subchamber through said partition annular opening and into said upper subchamber using said mechanical means; and sustaining a rotational liquid sewage third fluid flow within said upper subchamber for escape through said outlet means using said mechanical means;

thereby generating a fluid flow speed gradient between said liquid sewage third fluid flow and said liquid sewage first fluid flow.

25. A method of grit removal as in claim 24, further including the step of generating a fluid flow speed gradient between said liquid sewage third fluid flow and said liquid sewage first fluid flow, of such degree that about a 75% decrease in speed of said liquid sewage third fluid flow is achieved relative to that of said liquid sewage first fluid flow, the fluid flow speed gradient resulting from the liquid sewage third fluid flow and the liquid sewage first fluid flow.

26. A method of grit removal as in claim 25, further including the steps of radial liquid escape from said upper subchamber through said outlet means.

27. A method of grit removal as in claim 26, further including the step of cyclically pumping out grit from said grit storage secondary chamber, said grit pumping out being performed through a lengthwise hollow in said shaft.

28. A method for removing grit from liquid sewage while retaining organic solids in suspension including inlet means for admitting liquid sewage into the apparatus, outlet means for removing liquid from which grit has been separated from the apparatus, and means for removing separated grit from the apparatus, the method comprising the following steps:

providing a cylindrical grit settling main chamber defining a bottom end portion, a top end and a peripheral wall, a grit storage secondary chamber positioned below the main chamber bottom end portion such that grit settling out of the liquid will settle into said secondary chamber, said secondary chamber including a peripheral wall having a top mouth; a vertical shaft positioned centrally in said main chamber and in said secondary chamber, said shaft having a longitudinal axis;

causing rotation of said vertical shaft about said longitudinal axis using motorized means;

providing a partition extending transversely through said main chamber intermediate said top end and said bottom end thereof spacedly from said secondary chamber wherein an upper subchamber is formed in said main chamber above said partition and a lower subchamber is formed in said main chamber below said partition, wherein said liquid sewage inlet means is in fluid communication with said lower subchamber, and said liquid outlet means is in fluid communication with said upper subchamber, said partition having a peripheral edge integrally mounted to said peripheral wall of said main chamber; said partition including a bottom central aperture housing said shaft, said bottom aperture being spaced from said shaft to define an annular opening between said shaft and said partition to provide for upward flow of liquid from said lower subchamber to said upper subchamber; and mechanical means positioned within said main chamber;

generating a sustained rotational liquid sewage first fluid flow within said lower subchamber using said mechanical means;

inducing a vertical upward liquid sewage second fluid flow from said lower subchamber through said partition annular opening and into said upper subchamber using said mechanical means; and sustaining rotational liquid sewage third fluid flow within said upper subchamber for escape through said outlet means using said mechanical means;

thereby generating a fluid flow speed gradient between said liquid sewage third fluid flow and said liquid sewage first fluid flow.

\* \* \* \* \*